INVENTOR
VANNEVAR BUSH

BY James C. Wray
ATTORNEY

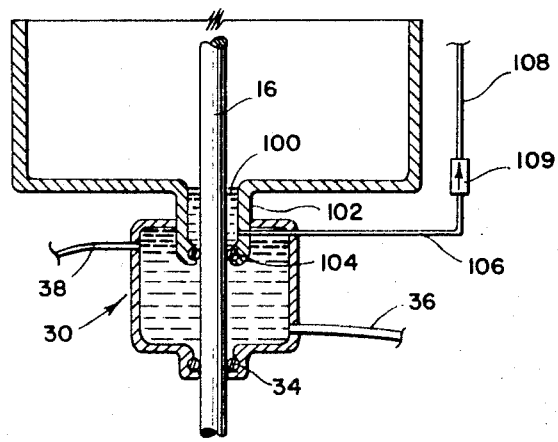
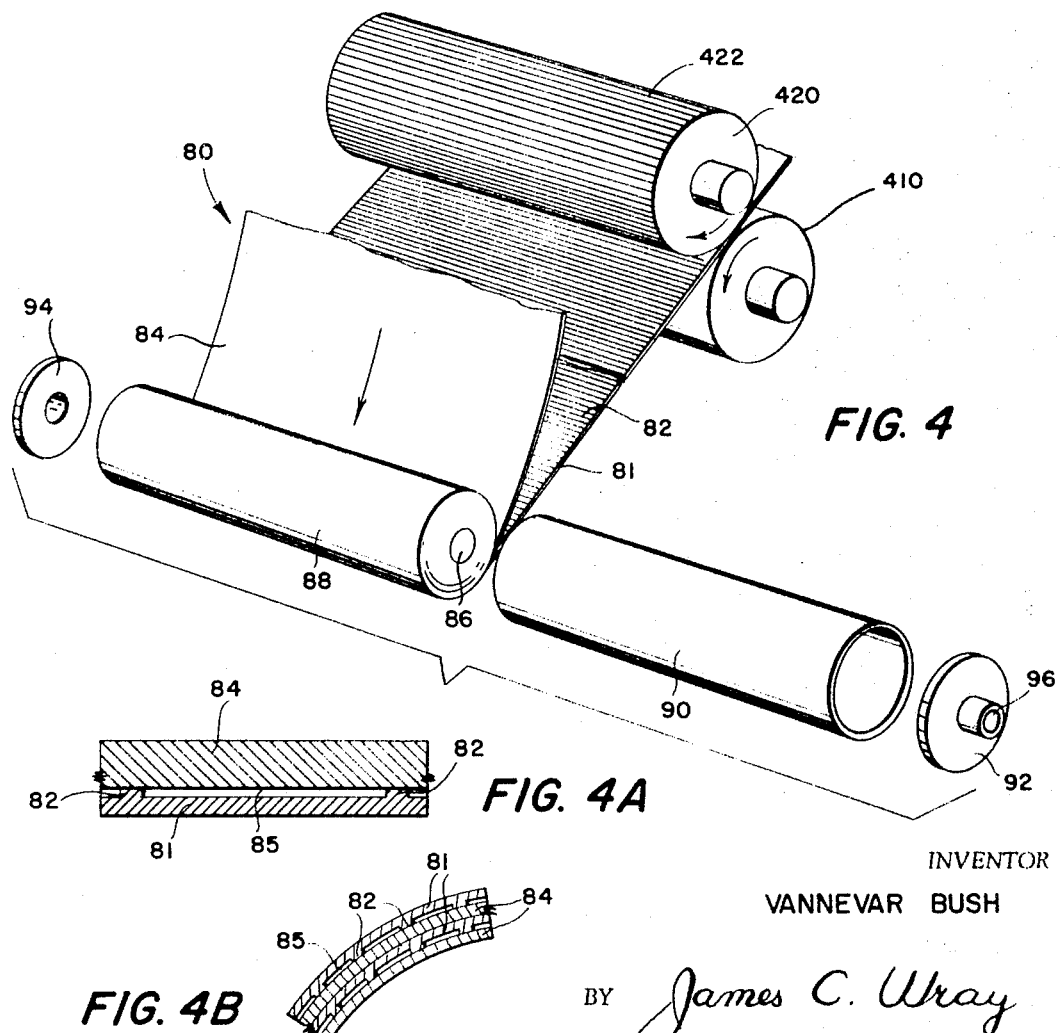

INVENTOR
VANNEVAR BUSH

BY *James C. Wray*

ATTORNEY

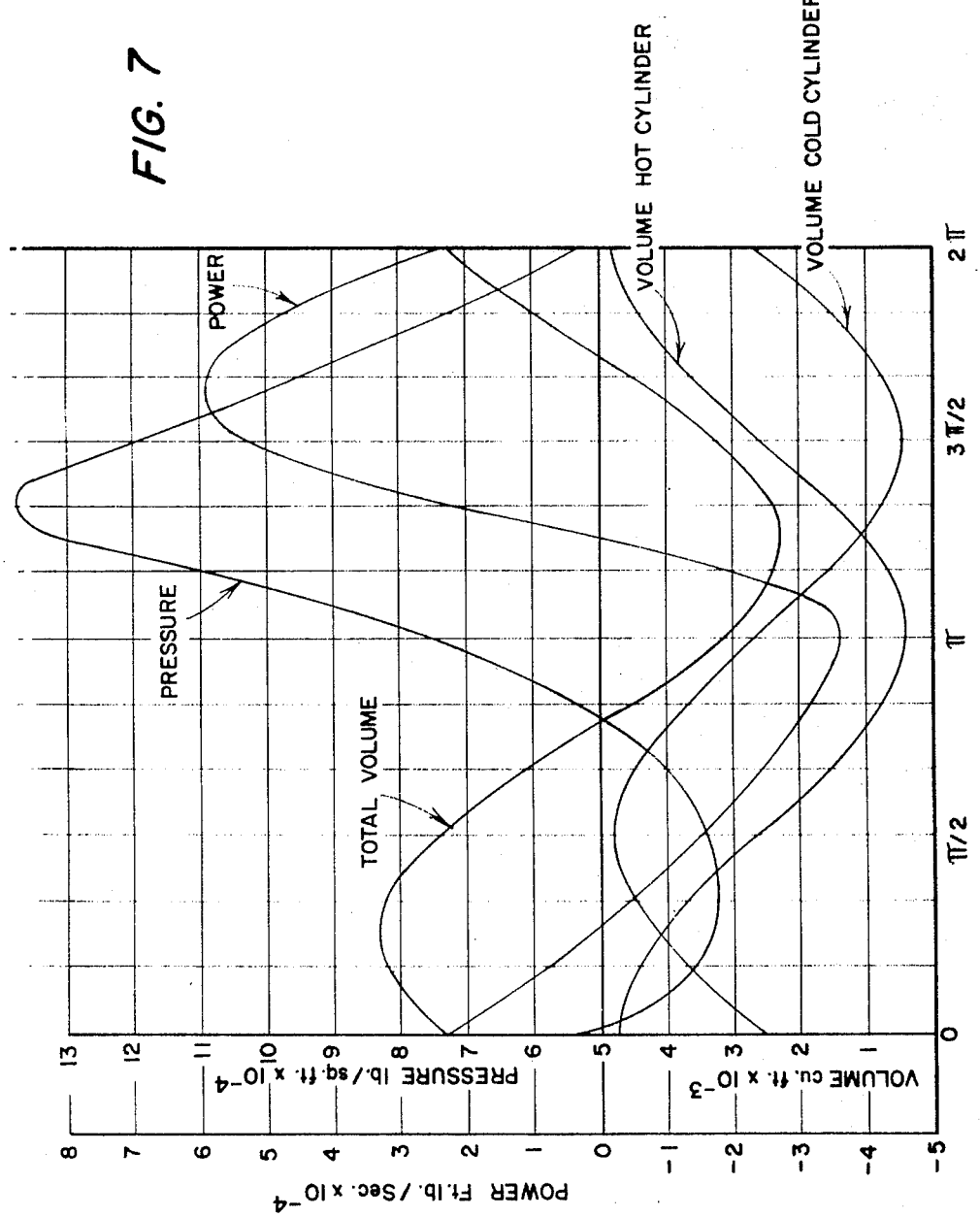

United States Patent Office 3,457,722
Patented July 29, 1969

3,457,722
HOT GAS ENGINES METHOD AND APPARATUS
Vannevar Bush, 304 March St., Belmont, Mass. 02178
Filed Apr. 5, 1966, Ser. No. 540,306
Int. Cl. F03g 7/06; F25b 9/00
U.S. Cl. 60—24                              8 Claims

ABSTRACT OF THE DISCLOSURE

Hot gas engines having heater and cooler bypasses for removing gas from the engines and heating and cooling the gas and returning it to the engine when engine pressures are low and little work is being performed, having improved phase differentiating means for hot and cold cylinders, having improved low volume regenerators with flat, fine through gas passages and having a self-pumping lubrication system are described herein.

---

This invention concerns engines which employ gas in closed heating and cooling cycles. More particularly this invention describes improved engine design and heat transfer methods and apparatus, as well as phase shifting and lubricating innovations which improve engine efficiency and output.

Hot gas engines have been made since 1825, when Stirling first introduced the regenerator and attained reasonably good efficiency. For a time small "hot air" engines were widely used, but later internal combustion engines overshadowed external combustion "hot air" engines.

Many advantages are found in hot gas engines. Pistons and lubricating materials are free from contact with burning gases; and, consequently, engine life can be very long. No ignition is required, and the engines can be quiet in operation. With a wide difference between upper and lower operating temperatures, theoretical maximum efficiency is high. With high mean internal pressures, engine output for a given cylinder volume is also theoretically high.

Efficiency of "hot air" engines with known methods of heat transfer has limited their use. Existing devices require large heat transfer surfaces, which introduce idle volume, and which reduce output. Known engines have high weight to horsepower ratios. High operating temperatures and pressures render lubrication difficult. Inability to rapidly adjust output limits use of the engines.

In each engine cycle there is an active period when most of the power output is produced. The active period occurs when total volume of the cylinders is increasing and when pressure is being maintained by passing gas through the regenerator to the hot cylinder. In each cycle there is also a relatively idle period when pressure is low.

In the present invention, the cycle is interrupted during the relatively idle period, and heating and cooling coils are connected into the circuit. Then, the coils are isolated from the circuit and the cycle proceeds. Upon the next opening of the valves, working gas passes into and out of the coils; some of the gas contained in the coils is discharged into the system, and the coils are refilled with gas from the system.

One object of this invention is to provide improved operation of hot gas engines.

This invention has as a second objective the provision of novel heat transfer methods for external combustion engines.

A third objective of this invention is the provision of novel hot gas engine heat transfer apparatus.

A further object of the invention is the provision of novel regenerator construction.

A further objective of this invention is to provide a novel lubricating system for engines.

A further objective of this invention is the provision of mechanisms and methods for relatively adjusting phase between two power shafts.

Providing improved output control for a multiple cylinder engine is another objective of this invention.

Further objectives of the invention will be apparent from the specifications and from the drawings, in which:

FIGURE 3 is an enlarged cutaway view of the lower end of the heated cylinder, and its lubrication system and piston rod water jacket;

FIGURE 4 is an exploded view of regenerator construction;

FIGURE 4A is an enlarged detail of the rolled regenerator material before it is coiled in final form;

FIGURE 4B is a detail of the assembled regenerator coils;

FIGURE 7 indicates volume, pressure and power curves for a hot gas engine.

ENGINE

Figure 1:
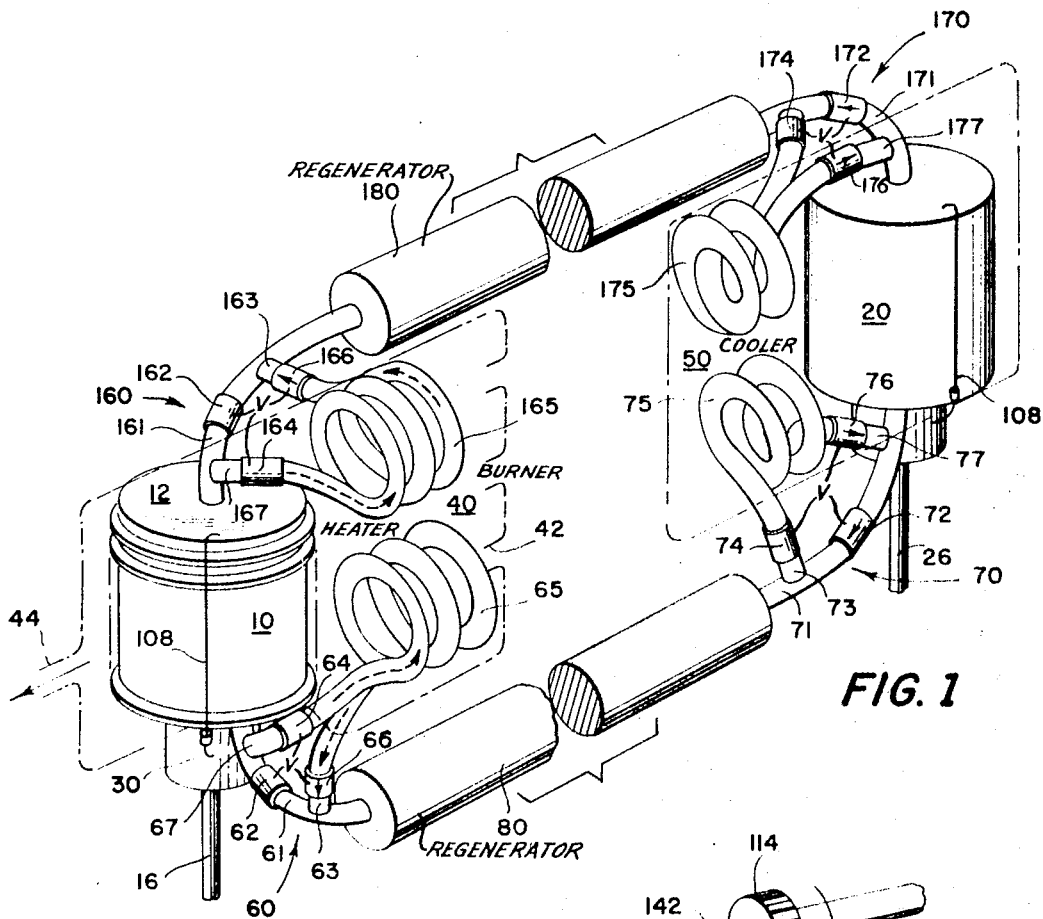
FIGURE 1 is a perspective view of an improved hot gas engine and its cylinders, regenerator, coils, furnace, and cooling apparatus.

Referring to FIGURE 1, a hot gas engine is composed of hot and cold double acting cylinders. The numeral 10 generally indicates a heated cylinder, while the cooled cylinder is designated 20. Water jacket 30 (see FIGURE 3 detail) cools piston rod 16 as it emerges from hot cylinder 10. Piston rod 16 further may be cooled by an oil splash bath from the crankcase.

Furnace 40 surrounds the finned hot cylinder 10 and encompasses heated coils 65 and 165. Fuel and air entering furnace 40 are preheated and acted upon by forced draft before passing through inlet ports 42. Combustion occurs adjacent coils 65 and 165. Alternatively, combustion may occur in a chamber remote from the coils, and hot combustion products may pass over the coils on their way to the finned surface of cylinder 10 and to exhaust port 44. Exhaust gasses are used to preheat incoming furnace air.

Refrigerator 50 may be cooled by circulating water. Contained within refrigerator 50 are gas cooling coils 75 and 175 as well as cold cylinder 20. The latter may have an extended heat transfer surface.

As shown in FIGURE 1 hot and cold cylinders are double-acting. Lower ends of cylinders 10 and 20 together with regenerator 80 and connections 60 and 70 comprise an independent lower system. Upper end 12 of hot cylinder 10, the upper end of cold cylinder 20, regenerator 180 and connections 160 and 170 define a separate upper system. Piston blow-by causes no difficulty, as gas used in both upper and lower systems is the same. Only small amounts leak by the pistons, and equal amounts leak back and forth. Moreover, gas from the two systems may be intentionally intermingled by connecting upper and lower systems to single hot and cold coils.

Since interconnections 60, 70, 160 and 170 add idle volume to the systems, internal volumes are held to a minimum in pipes 61, 71, 161 and 171 as well as in valves 62, 72, 162 and 172, in pipes 63, 67, 73, 77, and in similar pipes on the system side of valves leading to coils of the upper system. While connections are enlarged for clarity in FIGURE 1, actual pipes are much smaller than those shown. As discussed in further detail in the specification, gas passage volumes in regenerators 80 and 180 are minimal. Because valves isolate coils from the system, coils add no idle volume to the system. Lower system idle volume is limited to lower cylinder clearance, and the internal volume of connections 60 and 70 as well as the volume of regenerator 80.

Numerals 62, 64, 66, 72, 74 and 76 and similar numbers in the 100 series designate valves. As discussed in a section of the specification which discusses engine operation, valves 64, 74, 164 and 174 are poppet or rotary valves, which are operated or controlled by engine crankshafts to selectively connect coils to the system when system pressure is low. Valves 66, 76, 166 and 176 are check valves which permit flow of gas from the coils to the system when system pressure is less than pressure within the respective coils. Valves 72 and 172 may be check valves which permit flow from respective ends of cold cylinder 20 toward regenerators 80 and 180.

In hot gas engines, best results are obtained when hot cylinder and cold cylinder pistons operate 90° out of phase. Normally volume of the cold cylinder follows volume of the hot cylinder by 90° or one-quarter of a revolution. Thus, as volume of a hot cylinder has increased to a maximum, volume of a related cold cylinder will have increased to one-half of its maximum.

When the main pressure is being developed, especially at a point midway in the expansion of the hot cylinder, torque is delivered principally by the hot cylinder. For engines having hot cylinders operating on one crankshaft and cold cylinders on another, power take-off should be from the hot cylinder crankshaft.

PHASE SHIFTING

Engine output response to varied heat input is slow; consequently, power output is most effectively controlled by changing phase between coupled hot and cold cylinders. Preferably, adjustment is from 90° through 180° to −90°. Maximum power for one direction of rotation is produced at 90°. At 180° power output is zero, and the engine is in neutral. At −90° maximum power is produced in reverse rotation. In intermediate phase settings, power output may be smoothly adjusted from zero to maximum; hence, speed for a given load may be adjusted at any value from zero to full speed.

Figure 2:
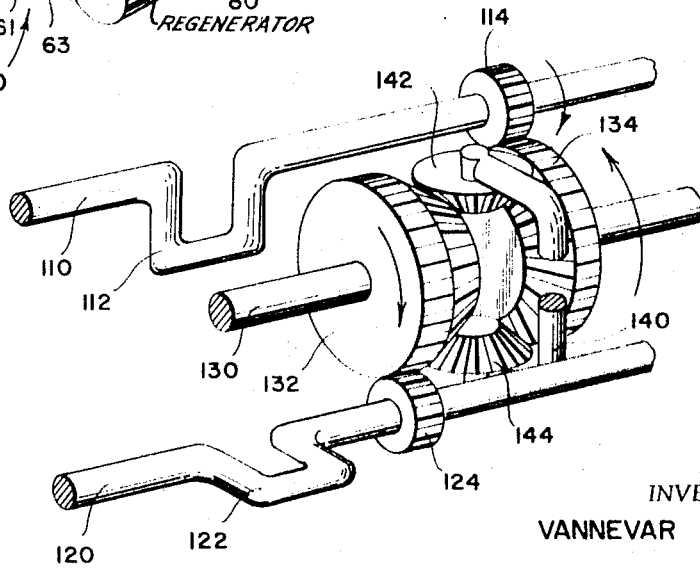
FIGURE 2 is a perspective view of engine crankshafts and one embodiment of phase shift gearing.

FIGURE 2 illustrates novel means for varying phase between two coupled crankshafts 110 and 120, which permits power take-off from either of the crankshafts or from shaft 130.

Crankshafts 110 and 120 are aligned perpendicular to a plane containing axes of cylinders 10 and 20. Piston rods 16 and 26 are connected respectively to crank 112 and to crank 122. Spur gear 124 is fixed on crankshaft 120 and meshes with gear 132. The bevelled portion of gear 132 drives pinions 142 and 144, while carrier 140 is held stationary. The pinions mesh with gear 134, which in turn drives gear 114, transferring power from the cold cylinder's crankshaft 120 to the hot cylinder's crankshaft 110. Engine power is preferably taken off crankshaft 110, since most of the engine's power is developed in the hot cylinder. The drive train is reversible, however, and power may be taken off either crankshaft 120 or shaft 130. Varying phase between the crankshafts is accomplished by turning carrier 140.

Figure 5:
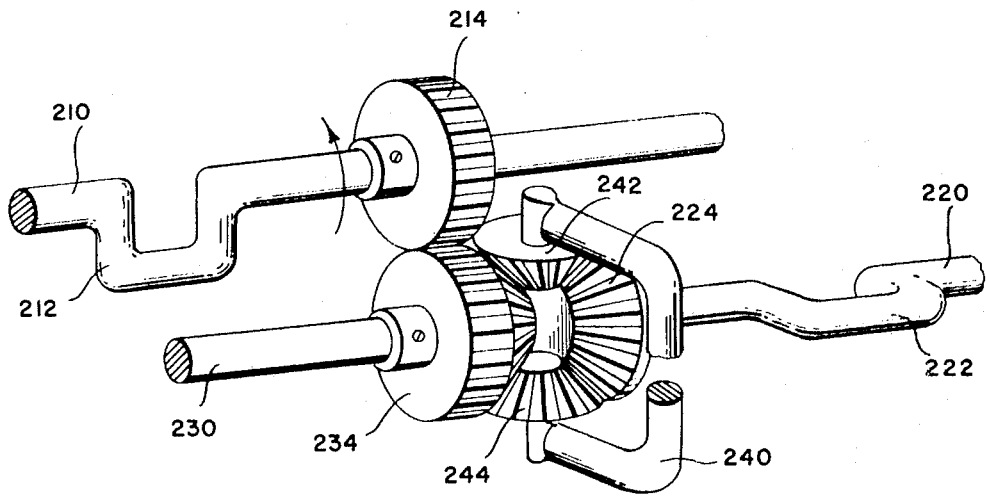
FIGURE 5 is a perspective illustration of a second embodiment of a phase shifting device for coupled crankshafts.

In FIGURE 5 alternate phase shifting apparatus is disclosed. Cold cylinder crankshaft 220 is rotated by crank 222, which in turn rotates bevel gear 224. Gear 224 drives pinions 242 and 244, which mesh with the beveled side of gear 234. Gear 234 drives spur gear 214, thereby completing transmission of power from the cold cylinder's crankshaft 220 to shaft 210. Power may be taken off any of the three shafts, and rotating the carrier 240 adjusts phase between the two crankshafts.

Figure 6:
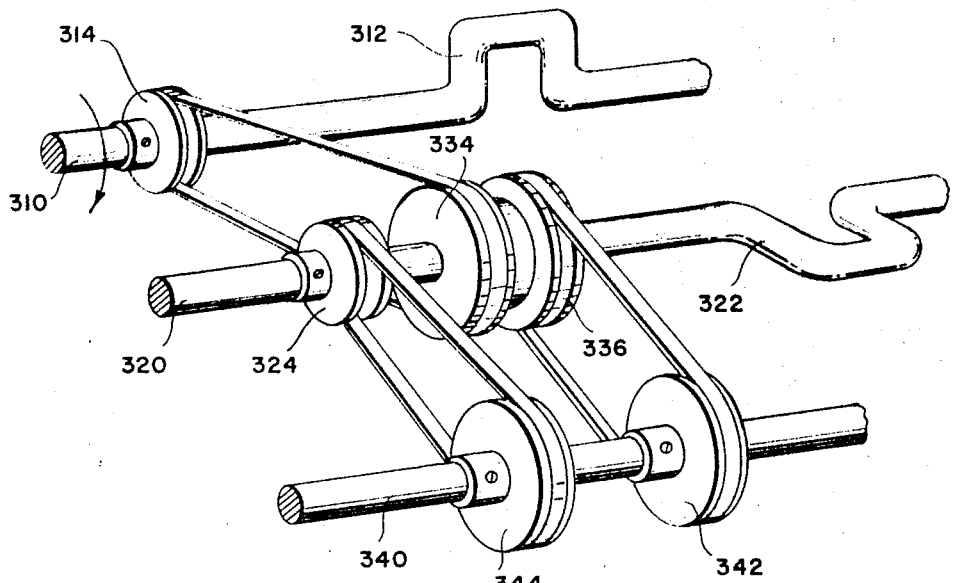
FIGURE 6 illustrates a third embodiment of shaft phase shifting apparatus.

A belt-driven transmission for shaft phase adjusting is set forth in FIGURE 6. Power is transferred from crankshaft 320 via pulley 324, interconnected pulleys 344 and 342, and double pulleys 336 and 334 to pulley 314, which is fixed on shaft 310. Shaft 340 is constrained for arcuate revolution about the centerline of shaft 320 so that phase angle between cranks 312 and 322 may be adjusted by arcuately moving shaft 340 about shaft 320. Pulleys 334, 336, 342 and 344 are twice as large as pulleys 314 and 324, so that rotating arm 340 through a 180° arc shifts relative phase of shafts 310 and 320 through 180°. If pulleys 314 and 324 are three times as small as the remainder of the pulleys, 180° phase shift between shafts 310 and 320 is accomplished by passing arm 340 through a 90° arc. When the ratio between pulleys 334 and 314 is 2:1, torque required to move arm 340 is equal to torque produced by crankshaft 310 at pulley 314.

SEALS AND LUBRICATION

As shown in FIGURE 3, the lubrication system has a cylindrical sump 102, which surrounds piston rod 16, and which is formed as a central depression in the lower surface of a cylinder. Oil 100 is collected in the sump, and variations in pressure between the top and bottom of the cylinder tend to move oil back and forth through fine tube 108. Check valve 109 prevents flow in a downward direction; hence, oil is pumped to the top of the cylinder. Oil maintained in sump 102 lubricates O-ring 104. In order to insure that sufficient oil remains above the O-ring, tube 106 communicates with sump 102 at some distance above the O-ring, preventing discharge of all of the oil. Tube 108 is extremely fine, and gas flow between opposite cylinder ends is negligible. If it is desired to seal tube 106 in the event of a low oil level in the sump, a simple float valve may close the inner end of the tube 106.

Silicone lubricant is recommended, since it has good operating characteristics at 600° F. Oil level may be read from a magnetic float, with a sump 102 constructed of a non-magnetic material. If the lubricant supply needs replenishing, oil may be injected at the top of the cylinder under 500 p.s.i. pressure.

O-ring 104 and piston rod 16 are cooled by water jacket 30. O-ring 34 seals the water jacket and piston rod. Flow is maintained in water jacket 30 through inlet 36 and outlet 38. A similar lubrication-sealing system and water jacket are connected beneath cold cylinder 20.

REGENERATOR

In an efficient regenerator, gas flow resistance should be small compared to working pressures. Thermal conduction along the regenerator should be small compared to heat input. Temperature difference between gas and metal should be small, and temperature variations of metal surfaces should be small compared to operating temperature difference for the heat cycle.

FIGURE 4 illustrates the construction of an improved regenerator 80. An upper sheet 81 is rolled between rollers 410 and 420. Roller 420 has a grooved surface 422 to produce spaced ridges 82, which extend across sheet 81. Sheet 81 is covered with sheet 84, which is identical to it with the exception that sheet 84 has no ridges. Sheets 81 and 84 are rolled on a ceramic mandrel 86 to form a cylindrical cartridge 88, defining openings 85 between adjacent sheets 81 and 84 and ridges 82. Cartridge 88 is inserted in tube 90, and all passages are plugged except rectangular openings 85. Caps 95 are fixed on the ends of tube 90, leaving small clearances at the ends of cartridge 88 to distribute gas to rectangular passages 85. Nipples 94 connect the regenerator 80 to adjacent tubing.

For a two-cylinder, double-acting engine having piston displacements of 6.28 cubic inches, running at 2000 r.p.m., using hydrogen at 500 p.s.i. when at 100° F., and operating between 660° F. and 100° F., a regenerator has been designed as follows. Sheet 81 is .012 inch thick and 5 inches wide. Five hundred ridges .004 inch high are spaced at 0.1 inch intervals, and the sheet is 50 inches long plus the sum of the ridge widths. Sheet 84 is identical in overall dimensions with sheet 81. Using a ceramic mandrel 5 inches long and having a ½ inch diameter results in cartridge 88 having approximately a 1⅓ inch diameter. All passages with the exception of openings 85 are plugged, and a small clearance is left between each cap 92 and cartridge 88. Cartridge 88 has five hundred openings 85 which are 0.1 by 0.004 inch. Total cross sectional area of openings 85 is 0.2 square inch; consequently, volume of the regenerator is 1 cubic inch, or 16% of cylinder volume.

ENGINE OPERATION

FIGURE 7 illustrates pressure, volume and power curves for a hot gas engine. Points of the abscissas are angles of rotation of hot cylinder crankshaft stated in radians. An example of the engine disclosed in FIGURE 1 comprises four double-acting cylinders 10 and 20. Each end of the cylinders has a piston displacement of 6.28 cubic inches, with a two inch stroke and two inch bore. The engine operates between temperature of 660° F. or 1120° R. in hot cylinder 10 and 100° F. or 560° R. in cold cylinder 20. The "hot air" engine runs at 2000 r.p.m. or 33.3 c.p.s., and, with reasonably small power losses, the engine produces 30 horsepower. Idle volume of regenerator 80 is 1 cubic inch or 16% of a piston displacement; tubing adds 4% idle volume for a total of 20%. Furnace exhaust is used to preheat incoming air so that flame temperature considerably exceeds 2500° F. Refrigeration is provided to the cold cylinder and to cooling coils by circulating water.

In an ideal engine, ignoring losses, for given temperatures, pressures and speed, power output is independent of gas used. Hydrogen and helium will improve heater-cooler operation because of high thermal conductivity. If helium is employed, .00136 pound is used at 500 p.s.i. and 100° F. Nitrogen may be used. If air is employed, air taken in should be passed through a chamber to extract oxygen; a heated chamber containing hot copper turnings is convenient for that purpose.

In a practical engine, a small pump may be connected to an output shaft to pump up the cylinders and to correct mean pressure therein. The engine will run idle when starting at atmospheric pressure until it pumps up to operating pressure. Replenishment gas can be introduced at 500 p.s.i.

In the examples of operation herein discussed, operating positions of the pistons are referred to as angles of the hot cylinder crankshaft. Angles are described in radians, and 0 indicates piston positions when hot cylinder volume is at a maximum. From 0 to $\pi$, volume of the lower end of the hot cylinder decreases from a maximum to a minimum. At $2\pi$, volume of the lower end of hot cylinder 10 is again a maximum. Operation of the lower end of cold cylinder 20 follows the lower end of hot cylinder 10 by 90°. At $\pi/2$, volume of the lower end of the cold cylinder is at a maximum. That volume decreases to a minimum at $3\pi/2$ and again reaches a half way point at $2\pi$. Operation of the upper system follows the lower system by 180°; hence, in the examples only the lower system is described.

In describing this invention, reference is made to normal operation and normal systems. These terms refer to known hot gas engines operating without heating and cooling bypass coils. "System" refers to all apparatus apart from the coils and their connecting tubes. "System pressure" refers to pressure outside of the coils. Examples of operation are described for hot and cold cylinders operating at maximum power with pistons 90° out of phase. All poppet valves which control operation of the heated and cooled coils may be connected to the cold cylinder crankshaft, so that changing phase of the two cylinders to reduce power does not interfere with relative operation of the valves.

At 180° out of phase operation, power output is zero. Beyond 180° the engine operates in reverse. From 90° to 180° changing valve-operating cams is unnecessary. When the two cylinders are between 180° and —90° out of phase, valve-operating cams on the cold cylinder shaft are shifted for reverse engine operation.

OPERATION EXAMPLE I

In the lower ends of cylinders 10 and 20 in FIGURE 1, valves 66 and 76 are check valves. Valves 62, 64, 72 and 74 are poppet or rotary valves. The rotary form may be preferable.

At zero radians, volume of hot cylinder 10 is at a maximum, and cold cylinder 20 has increased to one-half maximum volume. Valves 62 and 72 are closed, and valves 64 and 74 are opened.

At $\pi/2$ hot cylinder 10 has decreased to one-half volume, and cold cylinder 20 is at full volume. At that point valves 62 and 72 are opened, and valves 64 and 74 are closed.

In the interval zero to $\pi/2$ the volume of hot cylinder 10 is decreasing, and the volume of cold cylinder 20 is increasing; in normal cycles pressure and power output are low during this interval. Gas flows from hot cylinder 10 through valve 64 to coil 65, where it is strongly heated; through check valve 66 to regenerator 80 where the gas is cooled; through valve 74 to coil 75, where the gas is further cooled; and through check valve 76 into cold cylinder 20. Approximately one-half of a cylinder volume thus flows. If that half cylinder volume of gas is heated and cooled through twice the temperature range that would be needed were an entire cylinder volume treated, the result is the same as though one entire volume were acted upon by half of the temperature differential. There is no difficulty in attaining highly elevated temperatures in coil 65; furnace gases are extremely hot compared to the working temperature of cylinder 10. Superheated gas from coil 65 enters regenerator 80, not cylinder 10. Gas leaving the cold end of regenerator 80 is hotter than it would be if coil 65 were not used; hence, the gas readily gives up its heat in coil 75.

In previously known Stirling cycle engines, during the interval zero to $\pi/2$, pressure has declined slightly, while the total volume of the system has increased. Using the present system with bypass through coils 65 and 75, system pressure remains substantially constant from zero to $\pi/2$, because the volume of coils 65 and 75 is much greater than cylinder volume. There is no significant effect upon output, for at the end of the interval $$0 - \frac{\pi}{2}$$

total volume of the system returns to the value at which it started.

There is one appreciable effect of interconnecting the coils with the system during cyclic periods of low pressure. When the coils are isolated from the system at $\pi/2$, system pressure will be higher than in an unmodified cycle. As the cycle proceeds, beyond $\pi/2$, pressures will be higher than in systems without bypassing. High pressures are not a problem since maximum pressure can always be adjusted by altering the pressure at which the system is filled. Within a few cycles, pressures can be adjusted to desired levels.

The bypass interval may be extended points near 0 and $3\pi/4$. System pressures at the beginning and end of that interval are normally the same. With the extended interval, there is more transfer from hot cylinder 10 to coil 65, while there is less transfer from coil 75 to the cold cylinder. There is little change in output and efficiency is little affected, but means for introducing and extracting heat are improved. A choice of cutoff point may be made to avoid sudden rush of gas when the valve operates.

OPERATION EXAMPLE II

During the interval 0 to $\pi/2$, the lower end of cold cylinder 20 is increasing to a maximum volume and is drawing cold gas from coil 75 through check valve 76.

At $\pi/2$ poppet valve 74 is opened, and it is held open until $\pi$, when the volume of cold cylinder 20 has decreased to one-half maximum volume. Hence, after pressure in the system has risen somewhat, and after pressure in coil 75 has dropped, a flow of gas leaves regenerator 80 and enters coil 75 to be cooled. The pressures will soon come to equilibrium, with pressure in coil 75 slightly below system pressure. Before valve 74 opens system pressure is already low, and opening the valve merely drops the pressure further. After valve 74 is closed, gas is forced out of cold cylinder 20 through check valve 72 into regenerator 80 to become heated therein. Pressure rise is as great using the bypass coil as it is without the coil. Thus, the working gas may be adequately precooled in convenient apparatus without introducing significant pressure drops, and without significantly increasing idle volume.

The length of the interval in which valve 74 is open is subject to modification. Opening the valve between $\pi/2$ and $\pi$ is desirable, since system pressure is rising, while system volume is decreasing. (Volume of hot cylinder 10 and volume of cold cylinder 20 are decreasing.) Preventing system pressure rise by connecting coil 75 to the system is advantageous at this time, notwithstanding that subsequent pressure rise may be less than in normal conditions. Using a hot bypass coil, however, may require shortening the interval of valve 74.

OPERATION EXAMPLE III

Having excellent cooling in coil 75 as discussed in Example II, it helps regenerator action to introduce more heat at the hot end. Coil 65, which is located in the furnace, has considerable internal volume. Valve 62 may be held open. Valve 64 is a poppet valve, while 66 is a check valve, allowing flow from coil 65 to regenerator 80.

After pressure in coil 65 has risen somewhat due to heating, and while system pressure is low (from $\pi/4$ to $3\pi/4$), gas flows out of coil 65 through valve 66 back into the system. Operation of valve 74 is cut back from that discussed in Example II to the interval $\pi/2$ to $3\pi/4$. An abrupt initial rise in pressure occurs in a normal system while volumes of both cylinders are decreasing. During that time ($3\pi/4$ to $\pi$) poppet valve 64 is opened and held open, connecting coil 65 to the system, and reducing system pressure. Coil 65 may be made extremely hot, since gas leaving the coil merely passes into the regenerator. It is not necessary to pass a full cylinder volume of gas through entire cycle, since half a cylinder volume passing through coil 65 will supply all the heat necessary.

The engine may take several forms. Cylinders may be single or double acting. In the latter case, single coils may be connected in both upper and lower systems. Hot and cold cylinders may be arranged in banks, with hot cylinders connected to one crankshaft and cold cylinders connected to a second shaft. As in the case of all other hot gas engines, the apparatus disclosed herein becomes a refrigerator when driven by a motor in the reverse direction.

Although this invention has been described by specific embodiment and example, it will be obvious to one skilled in the art that its teachings may be employed in other ways. The invention is not limited to the particular applications disclosed herein; rather, the scope of the invention is defined in the appended claims.

I claim:
1. Hot gas engine apparatus comprising:
a hot chamber;
a cold chamber;
mechanical means cyclically varying volume of said chambers in phase displaced relationship;
a gas flow passage interconnecting said chambers, said passage having a heater connected parallel to the passage;
regenerator means connected in said passage;
valve means interconnected to said passage, said heater and to mechanical means, intermittently connecting said heater to said passage during a fraction of each cycle.

2. The method of transforming energy comprising:
providing hot and cold cylinder means,
cyclically varying volume within the hot and cold cylinder means in phase displaced relationship,
cyclically flowing gas back and forth through gas flow passage means including regenerator means between hot and cold cylinder means,
providing gas temperature changing heater means between the regenerator means and the hot cylinder means,
providing gas temperature-changing cooler means between the regenerator means and the cold cylinder means,
providing valve means between at least one temperature-changing means and the gas flow passage means, and
altering flow paths of working gas at predetermined points of a cycle by opening and closing the valve means in each cycle.

3. Stirling cycle energy transforming apparatus comprising:
hot cylinder means,
cold cylinder means,
pistons within the chamber means,
crankshaft means having crank means connected to the pistons at substantial angles for controlling piston movement within hot and cold cylinder means in phase displaced relationship,
gas flow passage means including regenerator means connected between the hot and cold cylinder means for cyclically passing working gas back and forth between the hot and cold cylinder means through the regenerator means,
gas temperature-changing heater means connected between the regenerator means and the hot cylinder means, and
gas temperature-changing cooler means connected between the regenerator means and cold cylinder means,
valve means connected between at least one temeprature changing means and the gas passage means for selectively permitting gas flow between said temperature-changing means and gas flow passage means,
control means connected to the valve means for operating the valve means and altering flow path of working gas during predetermined portions of cycles.

4. The apparatus of claim 3 wherein the said at least one temperature-changing means comprises the heater means, and where the heater means comprises a coil connected at opposite ends through valves to the gas passage means, thereby spanning a portion of the gas passage mans between the hot cylinder means and the regenerator means and wherein the said portion of the passage means includes a valve for blocking the said portion of the passage means, so that during periods in cycles, valves connecting the heater coil with the passage means may be open and the valve in the said section of the passage means may be closed to cause gas to flow through the heater, and so that during the other periods of cycles the valves between the heater coil and passage means may be closed and the valve in the said section of the passage means may be opened to isolate the heater from the passage means and to provide direct flow between the hot cylinder and the regenerator.

5. In a hot gas engine system having hot and cold chamber means and having gas passage means interconnecting said chamber means, an improved operating method comprising:
(A) connecting a first coil to said gas passage means adjacent said cold chamber means, and connecting a second coil to said gas passage means adjacent said hot chamber means;
(B) selectively permitting gas to flow from the engine into the first and second coil by opening a valve between said first coil and said passage means and by opening a second valve between said second coil and said passage means during a period of low system pressure and relatively lower coil pressure;
(C) effecting temperature change of gas within said first and second coils by cooling gas within said first coil and by heating gas within said second coil; and
(D) permitting gas to flow from said first coil through a first check valve to said engine and from said second coil through a second check valve into said engine.

6. Hot gas engine apparatus comprising:
(A) hot chamber means,
(B) cold chamber means,
(C) gas passage means interconnecting said hot chamber means and said cold chamber means,
(D) regenerator means connected in said passage means intermediate said hot and cold chamber means,
(E1) a gas heating coil connected to said passage means between said hot chamber and said regenerator, and
(E2) a gas cooling coil connected to said passage means between said regenerator and said cold chamber,
(F1) a first normally closed valve communicating said passage means with said heating coil,
(F2) a first check valve communicating said heating coil with said passage means,
(F3) a second normally closed valve communicating said passage with said cooling coil,
(F4) a second check valve communicating said cooling coil with said passage means,
(F5) means selectively opening said first normally closed valve, and
(F6) means selectively opening said second normally closed valve.

7. Hot gas engine apparatus comprising:
(A) a hot cylinder, a first piston and a first piston rod;
(B) a cold cylinder, a second piston and a second piston rod;
(C) gas passage means interconnecting said hot cylinder and said cold cylinder;
(D) regenerator means connected in said passage means intermediate said hot and cold cylinders;
(E) at least one temperature effecting coil connected to said apparatus between said regenerator and one of said cylinders;
(F) valve means selectively communicating said at least one coil with said apparatus;

(G) first and second parallel crankshafts respectively connected to said first and second piston rods;
(H) a third shaft disposed adjacent to said crankshafts;
(I) first power transmitting means connected to said first crankshaft;
(J) second power transmitting means connected to said second crankshaft;
(K) third power transmitting means mounted on said third shaft, interconnecting said first and second power transmitting means; and
(L) means positioning the third shaft with respect to the first and second crankshafts, thereby controlling phase relationship of the first and second crankshafts.

8. The method of transforming energy comprising:
providing hot and cold cylinder means,
cyclically varying volume within the hot and cold cylinder means in phase displaced relationship,
cyclically flowing gas back and forth through gas flow passage means including regenerator means between hot and cold cylinder means,
providing gas temperature-changing means between the regenerator means and one of the cylinder means,
providing valve means between the temperature-changing means and the gas flow passage means, and
altering flow paths of working gas at predetermined points of a cycle by opening and closing the valve means in each cycle.

References Cited

UNITED STATES PATENTS

| | | | |
|---|---|---|---|
| 3,145,527 | 8/1964 | Morgenroth | 60—24 |
| 2,643,508 | 6/1953 | Clay et al. | 60—24 |
| 3,216,190 | 11/1965 | Baker | 60—24 |
| 2,492,788 | 12/1949 | Dennis | 165—4 |
| 2,508,315 | 5/1950 | Van Weenen et al. | 60—24 |
| 2,583,311 | 1/1952 | Van Heeckeren | 60—24 |
| 2,602,645 | 7/1952 | Benenati et al. | 165—4 |
| 2,701,129 | 2/1955 | Yerrick | 165—4 |
| 3,275,102 | 9/1966 | Holzinger et al. | |
| 3,315,465 | 4/1967 | Wallis | 60—24 |

MARTIN P. SCHWADRON, Primary Examiner
ROBERT B. BUNEVICH, Assistant Examiner

U.S. Cl. X.R.
62—6